Nov. 11, 1930.          H. SCHRÖN          1,780,947

CRANK SHAFT

Filed Dec. 14, 1926

Inventor:
Hans Schrön
by [signature]
Attorney

Patented Nov. 11, 1930

1,780,947

UNITED STATES PATENT OFFICE

HANS SCHRÖN, OF MUNICH, GERMANY

CRANK SHAFT

Application filed December 14, 1926, Serial No. 154,838, and in Germany July 14, 1925.

This invention for which I have filed an application in Germany July 14, 1925 relates to multicylinder internal combustion engines. In four-stroke-cycle internal combustion engines having an even number of cylinders, each piston acting on one crank of the crank-shaft and the circulating and reciprocating masses being equal, the requirement of a uniform turning moment leads to the provision of pairwise parallel cranks wherefrom results, when the cranks are symmetrically arranged on the crank-shaft, the balancing of the pressure-moments of the masses around the transverse axis of the engine.

In machines, comprising an odd number of cylinders, this balancing does not exist per se, either in four-stroke-cycle or in two-stroke-cycle engines.

This is the reason why internal combustion engines with five cylinders or with a greater odd number of cylinders are used only very seldom, as special measurements are required when the cranks are uniformly displaced on the crank circle to reduce the effect of the pressure-moments of the masses disturbing the steady running of the engine, and resulting from the circulating and reciprocating masses.

According to the invention the smallest resulting pressure moment of the masses has to be obtained in two stroke and four stroke-internal combustion engines in that the cranks are arranged in the direction of the axis of the crank shaft on either side of the central crank so that they stand pairwise at equal distances from the same and are uniformly distributed on the crank circle in such a manner that from the central crank in any direction of rotation on one crank of the one side a crank of the other side follows, and that the cranks are projecting the farther from the central crank the greater is the distance from the same.

Figure 1:
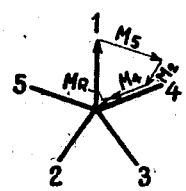
Figure 3:
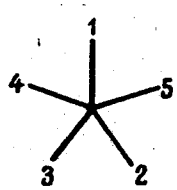
Figure 2:
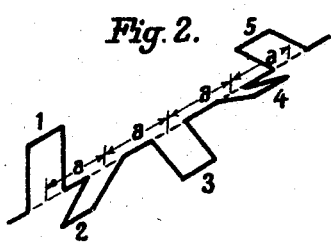

An embodiment of the invention is shown, by way of example, in the accompanying drawing, in which Figs. 1 and 2 show the arrangement of the cranks which is illustrated in Fig. 3 in mirror reflection.

Figure 4:
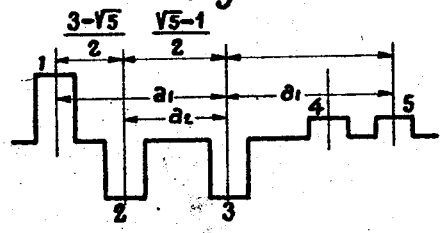

Fig. 4 shows the distance between the cylinders selected according to the invention.

In the first example of construction the cranks 1, 2, 3, 4 and 5 and the cylinders, which are not shown, have in the direction of the axis of the crank axle equal distances $a$ and their position on the crank-circle is such, that the moments $M_1$, $M_2$, $M_4$, $M_5$ of the circulating masses and of the reciprocating masses around the central crank 3 produce only a small resulting moment $M_R$.

The cranks are uniformly distributed on the crank circle and follow the one the other in clockwise direction in the succession 1 4 3 2 5 or 1 5 2 3 4, i. e. so that the central crank 3 bisects the angle between cranks 1 and 5, or 2 and 4 respectively.

The succession of ignition is 1 3 5 4 2 or 1 2 4 5 3 respectively for the four stroke cycle engines and 1 4 3 2 5 or 1 5 2 3 4 respectively for two stroke-cycle engines.

The moments of first order are made to disappear, if according to Fig. 4 the distance $a_2$ of the cylinders 2 and 3 or 5 and 4 respectively amounts to $$\frac{\sqrt{5}-1}{2}$$

times the distance $a_1$ of the cylinders 1 and 3 or 3 and 5 respectively.

The five cylinder engine according to the invention has a balancing of first and second order in its pressures of the masses. At equal cylinder distances there remains a little pressure moment of the masses of first order of the maximum value $M_R = 0.45 mrw^2 a$ ($m$ = mass, $r$ = crank radius, $w^2$ = angular speed of the shaft, and $a$ = cylinder distance), at unequal cylinder distances this moment can completely disappear. For seven cylinders the $M_R$ becomes even smaller.

I claim:—

1. A crank shaft for internal combustion engines with an odd number of cylinders at least five the pistons of which act each upon one crank of the crank shaft and all move equal circulating and reciprocating masses, comprising in combination a central crank, an even number of cranks arranged at either side of said central crank along the shaft axis so that they are pairwise at equal distances from said central crank and uniformly distributed around the crank circle and each piston on one side is followed in each direction of rotation by a piston on the other side of said central crank and the angular displacement of said cranks in relation to said central crank being the greater the farther the cranks are distant from said central crank.

2. A crank shaft having five cranks in which the consecutive numbering of the cranks is 1 4 3 2 5 in the crank star or mirror reflection and the distances of the cranks in axial direction of the shaft are equal.

In testimony whereof I affix my signature.

HANS SCHRÖN.